Oct. 21, 1958   J. M. DOUBLEDAY ET AL   2,856,898
ANIMAL-PROOF BIRD FEEDER
Filed Oct. 24, 1956
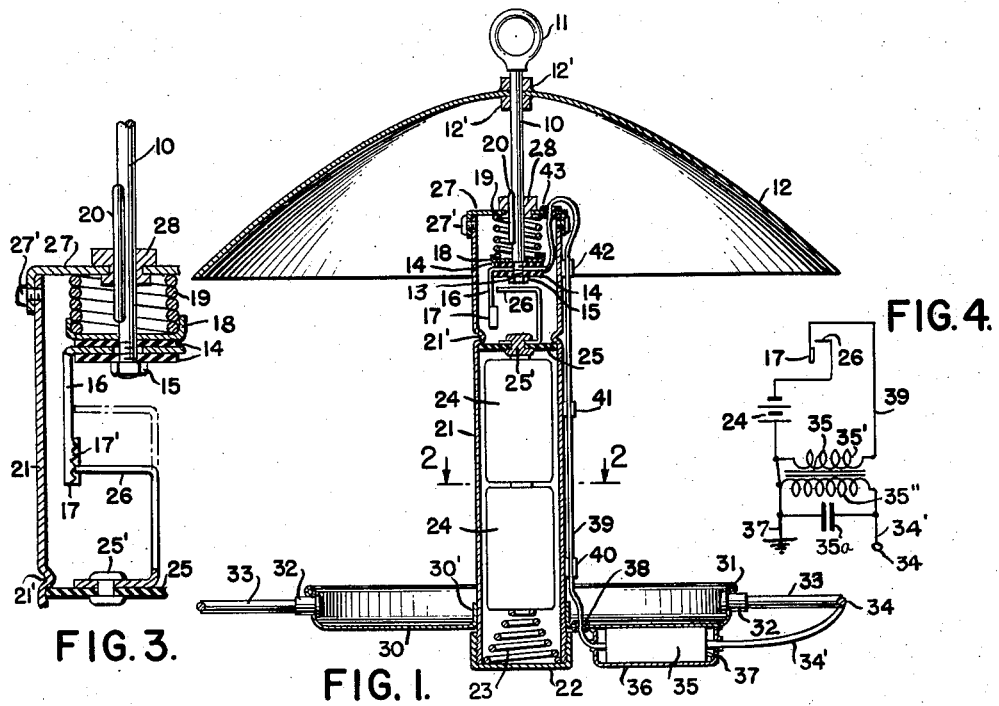
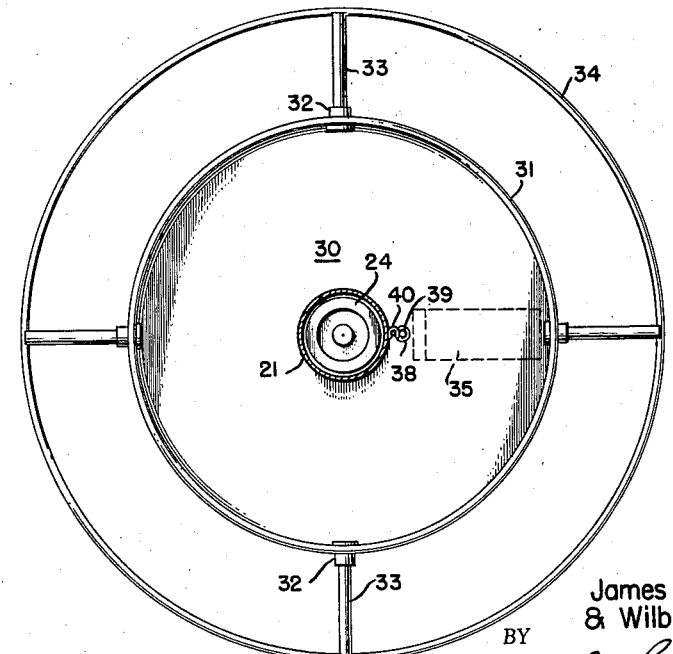
INVENTORS
James M. Doubleday
& Wilbur L. Y. Davis
BY
L. S. Saulsbury
ATTORNEY United States Patent Office 2,856,898
Patented Oct. 21, 1958

2,856,898
ANIMAL-PROOF BIRD FEEDER

James M. Doubleday, Ridgefield, Conn., and Wilbur L. Y. Davis, Freeport, N. Y.; said Davis assignor to said Doubleday Application October 24, 1956, Serial No. 618,070

5 Claims. (Cl. 119—51)

This invention relates to an animal-proof bird feeder.

It is the principal object of the present invention to provide a bird feeder which has electric shock means for ridding the feeder of squirrels, cats and other animals, without injury to them, which may come to eat the food placed therein for the birds.

It is another object of the invention to provide an animal-proof bird feeder that may be suspended from a tree or other elevated location and which will be operated under the weight of the squirrel, cat or other animal, which may infest the bird feeder to operate an electric shock device that will automatically impart electric shock to the animal to discourage it from molesting the birds.

It is still another object of the invention to provide an animal-proof bird feeder with a built-in electric shock device where the batteries are disposed in a vertically-extending casing in a flashlight manner that forms the support for the feed tray and in its upper end houses spring weight parts and the switch contacts.

It is a further object of the invention to provide an electric shock device for bird feeders and the like in which the batteries are used only when the feeder is subjected to the weight of the animal and wherein the make and break switch is merely in the form of two contacts with one being dragged over the other, thereby eliminating the need for a more expensive vibrating contact and condenser usually included with spark coil shocking devices.

It is a still further object of the invention to provide with an animal-proof bird feeder having an electric shock device and tray wherein the one secondary terminal is in the form of a ring encircling the tray on which a squirrel, cat or other animal must stand and from which it must extend its nose or feed to the food in the tray in order to be imparted an electric shock, its weight being sufficient to operate the contacts and so that similar shock can not be imparted to the birds, at least the smaller and more interesting type of birds which have much less weight than the animal and wherein even if sufficient small birds weighted the tray to close the contacts the ring terminal is sufficiently removed so that there is no likelihood of the bird bridging the ring and the tray either with its claws or with its bill.

Other objects of the present invention are to provide an animal-proof bird feeder, having the above objects in mind, which is of simple construction, has a minimum number of parts, easy to assemble, enclosed electrical circuit parts, inexpensive to manufacture, rainproof, consumes little space, light in weight, durable, automatic in operation, efficient and effective in use.

For a better understanding of the invention, reference may be had to the following detailed description taken in connection with the accompanying drawing, in which:

Figure 1 is a vertical sectional view of the animal-proof bird feeder embodying the features of the present invention, Fig. 2 is a transverse sectional view looking in plan upon the tray and terminal ring and as viewed on line 2—2 of Fig. 1, Fig. 3 is an enlarged fragmentary sectional view similar to Fig. 1 of the spring weight compressed and the switch contacts closed to impart the electric shock to the squirrel, and Fig. 4 is a wiring diagram of the electric shock device.

Referring now to the figures, 10 represents a support rod that has a top ring 11 by which the bird feeder can be attached to a tree, goose neck hook, or other elevated support. The support rod 10 has secured to its upper end, adjacent to the ring 10, a shelter 12 having outer and inner collars 12' to provide an elongated hub surrounding the rod to stabilize the shelter on the rod 10 and prevent its inclination relative thereto. On the lower end of the rod 10 is a reduced diameter threaded portion 13 receiving insulating washers 14 and a securing nut 15. Extending between the washers is a contact arm 16 depending downwardly and having an elongated contact 17 on the end thereof with a series of serrations 17' in the contact face thereof as best seen in Fig. 3.

A spring-retaining washer 18 surrounds the rod 10 and rests upon the upper insulating washer 14. Support rod 10 has a key 20 that is slidable through a top bushing 28 mounted on the upper end of a vertically-extending battery casing 21. The casing 21 has a bottom cap 22 with a supporting contact spring 23 that makes contact with vertically-aligned flashlight batteries 24 and forces them against a rivet 25' in an insulating plate 25. The insulating plate 25 is held in the casing 21 against upward displacement by an annular indentation 21' in the casing.

The rivet 25' secures a spring contact 26 to the insulating plate 25 that has an end adapted to rub over the serrations 17' on the fixed elongated contact 17. A cap 27 is secured to the upper end of the casing 21 by screws 27'. The bushing 28 is fixed to this cap 27. The upper end of the weight spring 19 engages the underface of the cap and surrounds the lower end of the bushing 28. Tightly fitted on the lower end of the casing 21 above the cap 22 is an annular food tray 30 having an upwardly turned inner flange 30' tightly fitting the casing 21. This tray has an outer peripheral rolled flange 31. The tray is made of metal and extending outwardly from its outer periphery under the rolled flange 31 and angularly spaced ninety degrees apart are insulating supports 33 rigidly held in the flange of the tray by bushings 32. A metal ring 34 is carried on the outer ends of these insulating supports 33 and may serve as a perch for the birds but better yet serves as a contact terminal for the feet of the animal.

By means of a wire 34' the ring 34 is connected to a secondary winding of a spark coil 35 housed in a housing 36 secured to the underside of the tray. The spark coil 35 has a primary coil 35' and the secondary coil 35" may have a condenser 35a. Both coils and the condenser are grounded at 37 to the housing 36. A grommet 38 is provided in the bottom of the tray 30 through which a primary wire 39 extends. This wire 39 runs upwardly along the outside of the battery casing 21 and through bushings 40, 41 and 42, and a grommet 43 in the top cover 27 and connected to the contact 16 having the contact end 17 normally out of engagement with the contact 26.

When the squirrel has landed on the tray with his feet spanning the contact ring 34 and the tray 30, the tray will be weighted so that the casing 21 is lowered against the action of the spring 19 and the contact 26 will rub over the serrations 17' on the contact end 17, making and breaking off the primary circuit, so as to shock the squirrel, cat or other animal, and cause his immediate departure from the bird feeder and eventually upon his repeated attempts to finally discourage him from going to the bird feeder for food which had been intended for the birds. Upon the animal's departure the tray and the casing 21 will be elevated under the action of the spring 19 and the drain on the batteries discontinued.

It should be understood that as well as providing a simple and compact assembly of an animal-proof bird feeder parts, along with these parts there has been included make and break contacts that operate by the weighting of the bird feeder to give the animal a series of electric shocks to make for simple and effective electric shock device without the need of a vibrator.

While various changes may be made in the detailed construction, it shall be understood that such changes shall be within the spirit and scope of the present invention as defined by the appended claims.

What is claimed is:

1. An animal-proof bird feeder comprising a support, feed tray means biasingly mounted on said support and movable relatively to the support, and an electric shocking device associated with said bird feeder having contacts carried respectively upon the support and tray means and operable upon said tray being weighted by an animal to energize the shocking device, and said electric shock device including an electric circuit with the tray means grounded therein and a terminal ring surrounding the tray means and radially spaced and insulated therefrom, said terminal ring serving as a perch for the birds but upon the animal weighting and spanning the ring and the tray causes the electric circuit to be closed and the animal to be shocked.

2. An animal-proof bird feeder comprising a support, feed tray means biasingly mounted on said support and movable relatively to the support, and an electric shocking device associated with said bird feeder having contacts carried respectively upon the support and tray means and operable upon said tray being weighted by an animal to energize the shocking device, and said electric shock device including an electric circuit with the tray means grounded therein and a terminal ring surrounding the tray means and radially spaced and insulated therefrom, said terminal ring serving as a perch for the birds but upon the animal weighting and spanning the ring and the tray causes the electric circuit to be closed and the animal to be shocked, and one of said contacts having a series of serrations on the contact thereof and the other of said contacts having a spring end adapted to ride over the serrations of the one contact and make and break the circuit.

3. An animal-proof bird feeder comprising a support, feed tray means biasingly mounted on said support and movable relatively to the support, and an electric shocking device associated with said bird feeder having contacts carried respectively upon the support and tray means and operable upon said tray being weighted by an animal to energize the shocking device, and said tray means including a spring connected to the support, a battery casing connected to the spring, said contacts lying within the battery casing and respectively mounted on the support and the battery casing.

4. An animal-proof bird feeder comprising a support, feed tray means biasingly mounted on said support and movable relatively to the support, and an electric shocking device associated with said bird feeder having contacts carried respectively upon the support and tray means and operable upon said tray being weighted by an animal to energize the shocking device, and said tray means including a flashlight type battery casing, said casing being biasingly connected at its upper end to the support and suspended therefrom, said battery casing having a removable bottom cap so that upon removal of the same batteries can be inserted within the casing, and a tray fitted about the lower end of the battery casing adjacent to the bottom cap and removable therefrom upon removal of the cap.

5. An animal-proof bird feeder comprising a rod support, a shelter fixed to said support, a balance spring carried on said rod support below the shelter, a flashlight type battery casing supported upon the balance spring, said battery casing having a removable bottom cap, a tray surrounding the lower end of the battery casing adjacent to the removable cap, an electric shocking device carried by the bird feeder including contacts lying within the battery casing and respectively mounted on the rod support and battery casing and operable to contact each other as the tray is weighted by an animal, said electric shocking device adapted to be grounded through the tray upon the contacts being closed, and a terminal perch ring surrounding the tray and insulatingly-supported therefrom, whereby upon the animal weighting and bridging the terminal ring and tray will be shocked.

References Cited in the file of this patent
UNITED STATES PATENTS

| | | |
|---|---|---|
| 817,448 | Shanahan | Apr. 10, 1906 |
| 1,623,840 | Kassy | Apr. 5, 1927 |
| 2,344,367 | Pueschel | Mar. 14, 1944 |